United States Patent
Fox et al.

(10) Patent No.: US 10,169,599 B2
(45) Date of Patent: Jan. 1, 2019

(54) DATA ACCESS CONTROL WITH FLEXIBLE DATA DISCLOSURE

(75) Inventors: Joshua Fox, Haifa (IL); Michael Pelts, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 12/548,123

(22) Filed: Aug. 26, 2009

(65) Prior Publication Data

US 2011/0055932 A1  Mar. 3, 2011

(51) Int. Cl.
*G06F 21/62* (2013.01)

(52) U.S. Cl.
CPC ................. *G06F 21/6218* (2013.01)

(58) Field of Classification Search
CPC ............................. G06F 21/62; G06F 21/6245
USPC .......................................................... 726/27
See application file for complete search history.

(56) References Cited

U.S. PATENT DOCUMENTS

| | | |
|---|---|---|
| 5,619,648 A | 4/1997 | Canale |
| 5,664,109 A * | 9/1997 | Johnson et al. ............... 705/2 |
| 5,940,843 A | 8/1999 | Zucknovich |
| 5,960,080 A * | 9/1999 | Fahlman ............ G06F 21/6209 380/252 |
| 6,052,682 A | 4/2000 | Miller |
| 6,115,704 A * | 9/2000 | Olson ............... G06F 17/30595 |
| 6,161,084 A | 12/2000 | Messerly |
| 6,178,439 B1 * | 1/2001 | Feit ............................... 709/200 |
| 6,226,635 B1 | 5/2001 | Katariya |
| 6,330,610 B1 | 12/2001 | Docter et al. |
| 6,336,117 B1 | 1/2002 | Massarani |
| 6,453,327 B1 | 9/2002 | Nielsen |
| 6,539,371 B1 | 3/2003 | Bleizeffer |
| 6,640,010 B2 | 10/2003 | Seeger |
| 6,820,082 B1 | 11/2004 | Cook |
| 6,820,237 B1 | 11/2004 | Abu-Hakima |
| 6,879,977 B2 | 4/2005 | Huffman |
| 6,928,618 B2 | 8/2005 | Kohls |
| 6,931,403 B1 | 8/2005 | Agrawal |
| 6,952,720 B2 | 10/2005 | Guedalia |

(Continued)

FOREIGN PATENT DOCUMENTS

| | | |
|---|---|---|
| EP | 1077421 A2 | 2/2001 |
| EP | 1638032 | 3/2006 |

(Continued)

OTHER PUBLICATIONS

Bier, Eric, et al., "The Rules of redaction: identify, protect, review (and repeat)," Palo Alto Research Center, 2009 IEEE.

(Continued)

*Primary Examiner* — Techane Gergiso
(74) *Attorney, Agent, or Firm* — Janaki K. Davda; Konrad, Raynes, Davda and Victor LLP (57) ABSTRACT

A method for presenting data, the method including presenting via a first computer output device an indicator indicating a data item whose value is prevented, in accordance with predefined access control criteria, from being presented via the first computer output device, receiving from a requestor a request to present the data item value, maintaining a record of an identity of the requestor together with a description of the requested data item, and presenting via a second computer output device the data item value.

9 Claims, 8 Drawing Sheets

(56) References Cited

U.S. PATENT DOCUMENTS

| | | | |
|---|---|---|---|
| 7,028,049 B1* | 4/2006 | Shelton | 705/3 |
| 7,181,495 B2 | 2/2007 | Skladman | |
| 7,194,693 B2 | 3/2007 | Cragun | |
| 7,206,814 B2 | 4/2007 | Kirsch | |
| 7,243,097 B1 | 7/2007 | Agrawal | |
| 7,293,017 B2 | 11/2007 | Hurst-hiller | |
| 7,316,032 B2 | 1/2008 | Tayebi et al. | |
| 7,412,605 B2 | 8/2008 | Raley | |
| 7,505,673 B2 | 3/2009 | Kreiner et al. | |
| 7,523,135 B2 | 4/2009 | Bradford | |
| 7,660,798 B1 | 2/2010 | Ludwig et al. | |
| 7,730,010 B2 | 6/2010 | Kishore | |
| 7,748,027 B2 | 6/2010 | Patrick | |
| 7,752,566 B1 | 7/2010 | Nelson | |
| 7,802,305 B1 | 9/2010 | Leeds | |
| 7,873,838 B2 | 1/2011 | Staddon | |
| 9,195,853 B2 | 11/2015 | Fox et al. | |
| 9,224,007 B2 | 12/2015 | Fox et al. | |
| 2002/0002577 A1* | 1/2002 | Garg | G06F 21/6218 718/104 |
| 2002/0143943 A1* | 10/2002 | Lee | G06F 21/41 709/225 |
| 2002/0165021 A1* | 11/2002 | Several | 463/17 |
| 2004/0003290 A1* | 1/2004 | Malcolm | H04L 63/0263 726/14 |
| 2004/0054918 A1 | 3/2004 | Duri | |
| 2004/0061716 A1 | 4/2004 | Cheung | |
| 2004/0073461 A1 | 4/2004 | Pappas | |
| 2004/0139043 A1 | 7/2004 | Lei et al. | |
| 2004/0240735 A1 | 12/2004 | Medina | |
| 2005/0140572 A1 | 6/2005 | Kahan | |
| 2005/0283471 A1 | 12/2005 | Ahmed | |
| 2006/0026159 A1 | 2/2006 | Dettinger | |
| 2006/0031301 A1 | 2/2006 | Herz | |
| 2006/0053097 A1 | 3/2006 | King | |
| 2006/0095276 A1* | 5/2006 | Axelrod | G06Q 99/00 717/104 |
| 2006/0136985 A1 | 6/2006 | Ashley | |
| 2006/0156222 A1 | 7/2006 | Chi | |
| 2006/0259954 A1 | 11/2006 | Patrick | |
| 2006/0259977 A1* | 11/2006 | Patrick | 726/26 |
| 2007/0030528 A1 | 2/2007 | Quaeler et al. | |
| 2007/0094284 A1 | 4/2007 | Bradford | |
| 2007/0094594 A1 | 4/2007 | Matichuk | |
| 2007/0118534 A1* | 5/2007 | Hayes et al. | 707/10 |
| 2007/0192122 A1 | 8/2007 | Routson et al. | |
| 2007/0192734 A1 | 8/2007 | Berstis | |
| 2007/0203776 A1 | 8/2007 | Austin et al. | |
| 2007/0239653 A1 | 10/2007 | Kiehn | |
| 2007/0255704 A1 | 11/2007 | Baek | |
| 2007/0266079 A1 | 11/2007 | Criddle et al. | |
| 2007/0271212 A1 | 11/2007 | Jones | |
| 2007/0274478 A1* | 11/2007 | Crawford, III | 379/100.05 |
| 2007/0276649 A1 | 11/2007 | Schubert | |
| 2008/0016341 A1 | 1/2008 | Staddon et al. | |
| 2008/0016372 A1 | 1/2008 | Staddon et al. | |
| 2008/0046757 A1 | 2/2008 | Staddon et al. | |
| 2008/0052759 A1 | 2/2008 | Kronlund | |
| 2008/0072290 A1 | 3/2008 | Metzer | |
| 2008/0204788 A1 | 8/2008 | Kelly | |
| 2008/0250021 A1 | 10/2008 | Boys | |
| 2008/0320604 A1* | 12/2008 | Nakajima et al. | 726/28 |
| 2009/0037222 A1 | 2/2009 | Kuo | |
| 2009/0089663 A1 | 4/2009 | Rebstock et al. | |
| 2009/0094675 A1* | 4/2009 | Powers | G06Q 50/24 726/1 |
| 2009/0132419 A1 | 5/2009 | Grammer | |
| 2009/0150981 A1* | 6/2009 | Amies | H04L 63/102 726/5 |
| 2009/0164878 A1* | 6/2009 | Cottrille | 715/210 |
| 2009/0164881 A1 | 6/2009 | Segarra et al. | |
| 2009/0192941 A1 | 6/2009 | Fournier | |
| 2009/0191846 A1* | 7/2009 | Shi | G06F 21/32 455/411 |
| 2009/0198697 A1* | 8/2009 | Bilger | G06F 21/6218 |
| 2009/0254572 A1* | 10/2009 | Redlich | G06Q 10/06 |
| 2009/0265316 A1 | 10/2009 | Poulin et al. | |
| 2009/0276701 A1 | 11/2009 | Nurmi | |
| 2009/0296166 A1 | 12/2009 | Schrichte | |
| 2009/0299853 A1 | 12/2009 | Jones | |
| 2009/0313682 A1* | 12/2009 | Rajput | H04L 63/102 726/4 |
| 2009/0323087 A1 | 12/2009 | Luo | |
| 2010/0010912 A1 | 1/2010 | Jones | |
| 2010/0046015 A1 | 2/2010 | Whittle | |
| 2010/0070396 A1 | 3/2010 | Schrichte | |
| 2010/0082652 A1 | 4/2010 | Jones | |
| 2010/0083004 A1* | 4/2010 | Kirshenbaum | G06F 21/6218 713/193 |
| 2010/0169343 A1* | 7/2010 | Kenedy | G06F 17/30867 707/758 |
| 2010/0229246 A1 | 9/2010 | Warrington | |
| 2010/0241844 A1 | 9/2010 | Hussain | |
| 2011/0055932 A1 | 3/2011 | Fox | |
| 2011/0066606 A1 | 3/2011 | Fox et al. | |
| 2011/0119361 A1 | 5/2011 | Issa et al. | |
| 2011/0119576 A1 | 5/2011 | Aumann | |
| 2011/0162084 A1 | 6/2011 | Fox et al. | |
| 2011/0179352 A1 | 7/2011 | Treadwell et al. | |
| 2011/0239113 A1 | 9/2011 | Hung | |
| 2011/0247081 A1 | 10/2011 | Shelton | |
| 2012/0159296 A1 | 6/2012 | Rebstock et al. | |
| 2012/0192066 A1 | 7/2012 | Fox et al. | |
| 2012/0239380 A1 | 9/2012 | Cumby et al. | |
| 2012/0304304 A1 | 11/2012 | Avrahami et al. | |
| 2013/0117802 A1 | 5/2013 | Fendt | |
| 2013/0144901 A1 | 6/2013 | Ho et al. | |
| 2013/0151346 A1 | 6/2013 | Schoen | |
| 2013/0185634 A1 | 7/2013 | Fox et al. | |
| 2014/0129936 A1 | 5/2014 | Richards et al. | |
| 2014/0136941 A1 | 5/2014 | Avrahami et al. | |

FOREIGN PATENT DOCUMENTS

| | | |
|---|---|---|
| EP | 1818807 | 8/2007 |
| EP | 2375353 A1 | 10/2011 |
| JP | 2004252773 | 9/2004 |
| WO | WO2006041318 A1 | 4/2006 |
| WO | WO2006104810 A2 | 10/2006 |
| WO | WO2006104810 A3 | 10/2006 |
| WO | WO2007044970 A2 | 4/2007 |
| WO | WO2008005017 A1 | 1/2008 |
| WO | WO2008122825 A1 | 10/2008 |

OTHER PUBLICATIONS

Damiani, Ernesto et al., "A Fine-Grained Access Control System for XML Documents," SCM Transactions on Information and System Security, vol. 5, No. 2, May 2002, pp. 169-202.

Deguillaume, Frederic, et al., Computer Science Department, CUI—University of Geneva, 24, rue du General Dufour, CH-1211 Geneva 4, Switzerland, "Protocols for data-hiding based text document security and automatic processing," IEEE Xplore.

Document Technology Systems Redaction Overview, Document Technology Systems, 525 Portage Trail Extension West, Cuyahoga Falls, OH 44223, http://dts-doc.com/dtswebsite/Documents/DTS%20Redaction%20Overview.pdf.

Google Hacking, WIkipedia, the Free Encyclopedia, (retrieved Jun. 16, 2010), http://en.wikipedia.org/wiki/Google_hacking.

IBM, "Privacy for Instant-Message or Email Popups", IP.Com, Mar. 16, 2009, https://priorart.ip.com/download/IPCOM000180738D/IPCOM000180738D.pdf.

Intellidact Intelligent Redaction Software, Computing System Innovations, 791 Piedmont Wekiwa Road, Apopka, FL 32703, http://www.csisoft.com/applications/Intellidact_flyer.pdf.

Kazem Taghva, et al., Information Science Research Institute University of Nevada, Las Vegas, "Identification and Redaction of Privacy Information in Scanned Documents," The 5th International Conference on Information Technology and Applications (ICITA 2008).

(56) References Cited

OTHER PUBLICATIONS

Porat, Sara et al., "Masking gateway for enterprises," IBM Haifa Research Lab, Spinger-Verlag Berlin Heidelberg 2009.
Rogers, G., "Googling Google: Google Gives Malware the Finger," ZDNet, CBS Interactive, Inc., Aug. 4, 2006, (retrieved Jun. 16, 2010), http://www.zdnet.com/blog/google/google-gives-malware-the-finger/283.
Stolfo, et al., "PARULEL: Parallel Rule Processing Using Meta-rules for Redaction," Department of Computer Science, Columbia University, New York, NY 10027, Jun. 25, 1991, pp. 1-47.
"Turn Desktop Alerts on or off," Microsoft Office Support, Outlook 2007, downloaded Apr. 26, 2012, http://office.microsoft.com/en-us/outlook-help/turn-desktop-alerts-on-or-off-HA010098670.aspx.
Wong, Alexander, et al., Department of Electrical and Computer Engineering University of Waterloo Waterloo, Ontario, Canada, "Expert Knowledge Based Automatic Regions-of-Interest (ROI) Selection in Scanned Documents for Digital Image Encryption," Proceedings of the 3rd Canadian Conference on Computer and Robot Vision (CRV'06).
U.S. Appl. No. 12/548,123, filed May 8, 2012_NonfinalRejection.
U.S. Appl. No. 12/559,720, filed Mar. 1, 2012_NonfinalRejection.
U.S. Appl. No. 12/559,720, filed Jun. 1, 2012_ResponseToNonfinalRejection.
U.S. Appl. No. 12/559,720, filed Aug. 27, 2012_FinalRejection.
U.S. Appl. No. 12/648,413, filed Sep. 27, 2012_NonfinalRejection.
U.S. Appl. No. 12/559,720, filed Dec. 27, 2012_ResponseToFinalRejection(RCE).
U.S. Appl. No. 12/648,413, filed Feb. 1, 2013_ResponseNonfinalRejection.
IBM, "InfoSphere Guardium Data Redaction", Solution Brief, IBM Software, Jul. 2012.
Redact-It Overview, http://www.redact.com/overview, downloaded Feb. 10, 2012.
U.S. Department of Energy Office of Science, The Office of Science Graduate Fellowship Program, "Resources for Handling Transcripts," downloaded Sep. 30, 2012, http://scgf.orau.gov/transcripts-resources.html.
ZyLAB, "Use Intelligent Redaction Tools to Secure Your Data", downloaded on Sep. 24, 2012.
PCT/IB2013/050355_May 3, 2013_InternationalSearchReportAndWrittenOpinion.
U.S. Appl. No. 12/648,413, filed Aug. 8, 2013_FinalRejection.
Office Action, dated Mar. 1, 2012, for U.S. Appl. No. 12/559,720, filed Sep. 15, 2009, entitled, "Search Engine With Privacy Protection", invented by Joshua Fox et al., Total 32 pages.
Response to Office Action, dated May 9, 2012, for U.S. Appl. No. 12/559,720, filed Sep. 15, 2009, entitled, "Search With Engine Privacy Protection", invented by Joshua Fox et al., Total 8 pgs.
Supplemental Amendment, dated Jun. 1, 2012, for U.S. Appl. No. 12/559,720, filed Sep. 15, 2009, entitled, "Search Engine With Privacy Protection", invented by Joshua Fox et al., Total 19 pgs.
Final Office Action, dated Aug. 27, 2012, for U.S. Appl. No. 12/559,720, filed Sep. 15, 2009, entitled, "Search Engine With Privacy Protection", invented by Joshua Fox et al., Total 34 pages.
Response to Final Office Action, dated Dec. 27, 2012, for U.S. Appl. No. 12/559,720, filed Sep. 15, 2009, entitled, "Search Engine With Privacy Protection", invented by Joshua Fox et al., Total 21 pgs.
Notice of Allowance, dated Jun. 20, 2014, for U.S. Appl. No. 12/559,720, filed Sep. 15, 2009, entitled, "Search Engine With Privacy Protection", invented by Joshua Fox et al., Total 15 pages.
Preliminary Amendment, dated Mar. 27, 2012, for U.S. Appl. No. 12/648,413, filed Dec. 20, 2009,entitled, "Selecting Portions of Computer-Accessible Documents for Post-Selection Processing", invented by Joshua Fox et al., Total 6 pages.
Office Action, dated Sep. 27, 2012, for U.S. Appl. No. 12/648,413, filed Dec. 29, 2009,entitled, "Selecting Portions of Computer-Accessible Documents for Post-Selection Processing", invented by Joshua Fox et al., Total 19 pages.
Response to Office Action, dated Feb. 1, 2013, for U.S. Appl. No. 12/648,413, filed Dec. 29, 2009,entitled, "Selecting Portions of Computer-Accessible Documents for Post-Selection Processing", invented by Joshua Fox et al., Total 12 pages.
Final Office Action, dated Aug, 8, 2013, for U.S. Appl. No. 12/648,413, filed Dec. 29, 2009,entitled, "Selecting Portions of Computer-Accessible Documents for Post-Selection Processing", invented by Joshua Fox et al., Total 34 pages.
Response to Final Office Action, dated Nov. 8, 2013, for U.S. Appl. No. 12/648,413, filed Dec. 20, 2009,entitled, "Selecting Portions of Computer-Accessible Documents for Post-Selection Processing", invented by Joshua Fox et al., Total 15 pages.
Office Action, dated Dec. 5, 2013, for U.S. Appl. No. 12/648,413, filed Dec. 29, 2009,entitled, "Selecting Portions of Computer-Accessible Documents for Post-Selection Processing", invented by Joshua Fox et al., Total 37 pages.
Response to Office Action, dated Apr. 4, 2014, for U.S. Appl. No. 12/648,413, filed Dec. 29, 2009,entitled, "Selecting Portions of Computer-Accessible Documents for Post-Selection Processing", invented by Joshua Fox et al., Total 14 pages.
Final Office Action, dated Aug. 28, 2014, for U.S. Appl. No. 12/648,413, filed Dec. 29, 2009,entitled, "Selecting Portions of Computer-Accessible Documents for Post-Selection Processing", invented by Joshua Fox et al., Total 36 pages.
Preliminary Amendment, dated Mar. 27, 2012, for U.S. Appl. No. 13/431,032, filed Mar. 27, 2012, entitled, "Selecting Portions of Computer-Accessible Documents for Post-Selection Processing", invented by Joshua Fox et al., Total 6 pages.
Office Action, dated Jul. 2, 2014, for U.S. Appl. No. 13/431,032, filed Mar. 27, 2012, entitled, "Selecting Portions of Computer-Accessible Documents for Post-Selection Processing", invented by Joshua Fox et al., Total 19 pages.
Response to Office Action, dated Oct. 2, 2014, for U.S. Appl. No. 13/431,032, filed Mar. 27, 2012, entitled, "Selecting Portions of Computer-Accessible Documents for Post-Selection Processing", invented by Joshua Fox et al., Total 7 pages.
Office Action, dated Mar. 7, 2007, 2014, for U.S. Appl. No. 13/350,794, filed Jan. 15, 2012, entitled "Automated Document Redaction", invented by Joshua Fox et al., Total 36 pgs.
Response to Office Action, dated Jun. 9, 2014, for U.S. Appl. No. 13/350,794, filed Jan. 15, 2012, entitled "Automated Document Redaction", invented by Joshua Fox et al., Total 13 pgs.
US Patent Application, dated Mar. 26, 2014, for U.S. Appl. No. 14/228,246, filed Mar. 27, 2014, entitled "Focused Personal Identifying Information Redaction", invented by Joshua Fox et al., Total 27 pages.
Notice of Allowance, dated Oct. 14, 2014, for U.S. Appl. No. 12/559,720, filed Sep. 15, 2009, entitled, "Search Engine With Privacy Protection", invented by Joshua Fox et al., Total 8 pages.
International Preliminary Report on Patentability, dated Mar. 20, 2012, for International Application No. PCT/EP2010/062729, filed Aug. 31, 2010, Total 12 pages.
International Search Report, dated Mar. 24, 2011, for International Application No. PCT/EP2010/062729, filed Aug. 31, 2010, Total 6 pages.
Written Opinion of the International Searching Authority, dated Mar. 15, 2012, for International Application No. PCT/EP2010/062729, filed Aug. 31, 2010, Total 11 pages.
International Preliminary Report on Patentability, dated Jul. 15, 2014, for International Application No. PCT/IB2013/050355, filed Jan. 15, 2013, Total 5 pages.
Response to Final Office Action, dated Dec. 23, 2014, for U.S. Appl. No. 12/648,413, filed Dec. 29, 2009, invented by Joshua Fox, Total 12 pages.
Final Office Action, dated Dec. 19, 2014, for U.S. Appl. No. 13/350,794, filed Jan. 15, 2012, invented by Joshua Fox, Total 36 pages.
Supplemental Amendment, dated Oct. 14, 2014, for U.S. Appl. No. 12/559,720, filed Sep. 15, 2009, invented by Joshua Fox, Total 1 page.
Supplemental Amendment, dated Sep. 25, 2014, for U.S. Appl. No. 12/559,720, filed Sep. 15, 2009, invented by Joshua Fox, Total 7 pages.

(56) References Cited

OTHER PUBLICATIONS

Restriction Requirement, dated Mar. 7, 2014, for U.S. Appl. No. 12/559,720, filed Sep. 15, 2009, invented by Joshua Fox, Total 6 pages.
Response to Restriction Requirement, dated May 8, 2014, for U.S. Appl. No. 12/559,720, filed Sep. 15, 2009, invented by Joshua Fox, Total 10 pages.
Office Action, dated Jan. 28, 2015, for U.S. Appl. No. 13/676,712, filed Nov. 14, 2012, invented by Joshua Fox, Total 31 pages.
Response to Office Action, dated Apr. 28, 2015, for U.S. Appl. No. 13/676,712, filed Nov. 14, 2012, invented by Joshua Fox, Total 9 pages.
Final Office Action, dated Jun. 10, 2015, for U.S. Appl. No. 13/676,712, filed Nov. 14, 2012, invented by Joshua Fox, Total 25 pages.
Notice of Allowance, dated Jan. 30, 2015, for U.S. Appl. No. 12/559,720, filed Sep. 15, 2009, invented by Joshua Fox, Total 10 pages.
Office Action, dated Apr. 10, 2015, for U.S. Appl. No. 12/648,413, filed Dec. 29, 2009, invented by Joshua Fox et al., Total 45 pages.
Response to Final Office Action, dated Mar. 19, 2015, for U.S. Appl. No. 13/350,794, filed Jan. 15, 2012, invented by Joshua Fox et al., Total 12 pages.
Notice of Allowance, dated Apr. 8, 2015, for U.S. Appl. No. 13/350,794, filed Jan. 15, 2012, invented by Joshua Fox et al., Total 13 pages.
C. Cumby et al., "A Machine Learning Based System for Semi-Automatically Redacting Documents", dated 2011, Proceedings of the Twenty-Third Innovative Applications of Artificial Intelligence Conference, Total 8 pages.
Final Office Action, dated Feb. 5, 2015, for U.S. Appl. No. 13/431,032, filed Mar. 27, 2012, invented by Joshua Fox, Total 20 pages.
Response to Final Office Action, dated Apr. 28, 2015, for U.S. Appl. No. 13/431,032, filed Mar. 27, 2012, invented by Joshua Fox, Total 9 pages.
Response to Final Office Action, dated Sep. 10, 2015, for U.S. Appl. No. 13/676,712, filed Nov. 14, 2012, invented by Shlomit Avrahami et al., Total 9 pages.
Response to Final Office Action, dated Oct. 13, 2015, for U.S. Appl. No. 13/676,712, filed Nov. 14, 2012, invented by Shlomit Avrahami et al., Total 10 pages.
Notice of Allowance, dated Jun. 19, 2015, for U.S. Appl. No. 12/559,720, filed Sep. 15, 2009, invented by Joshua Fox, Total 15 pages.
Office Action, dated Nov. 20, 2015, for U.S. Appl. No. 14/842,731, filed Sep. 1, 2015, invented by Joshua Fox, Total 30 pages.
Response to Office Action, dated Jul. 10, 2015, for U.S. Appl. No. 12/648,413, filed Dec. 29, 2009, invented by Joshua Fox, Total 14 pages.
Final Office Action, dated Nov. 20, 2015, for U.S. Appl. No. 12/648,413, filed Dec. 29, 2009, invented by Joshua Fox, Total 49 pages.
Office Action, dated Jul. 22, 2015, for U.S. Appl. No. 13/431,032, filed Mar. 27, 2012, invented by Joshua Fox, Total 30 pages.
Response to Office Action, dated Oct. 22, 2015, for U.S. Appl. No. 13/431,032, filed Mar. 27, 2012, invented by Joshua Fox, Total 8 pages.
Notice of Allowance, dated Jul. 20, 2015, for U.S. Appl. No. 13/350,794, filed Jan. 15, 2012, invented by Joshua Fox, Total 14 pages.
US Patent Application, dated Sep. 1, 2015, for U.S. Appl. No. 14/842,731, filed Sep. 1, 2015, invented by Joshua Fox, Total 38 pages.
Final Office Action, dated May 11, 2016, for U.S. Appl. No. 13/676,712, filed Nov. 14, 2012, invented by Joshua Fox, Total 21 pages.
Response to Final Office Action, dated Jun. 14, 2016, for U.S. Appl. No. 14/842,731, filed Sep. 1, 2015, invented by Joshua Fox, Total 9 pages.
Notice of Allowance, dated Jun. 15, 2016, for U.S. Appl. No. 13/431,032, filed Mar. 27, 2012, invented by Joshua Fox et al., Total 9 pages.
Office Action, dated Dec. 16, 2015, for U.S. Appl. No. 13/676,712, filed Nov. 14, 2012, invented by S. Avrahami et al., Total 21 pages.
Response to Office Action, dated Mar. 16, 2016, for U.S. Appl. No. 13/676,712, filed Nov. 14, 2012, invented by S. Avrahami et al., Total 11 pages.
Notice of Allowance, dated Jun. 19, 2015, for U.S. Appl. No. 12/559,720. filed Sep. 15, 2009, invented by Joshua Fox, Total 13 page.
Response to Office Action, dated Feb. 22, 2016, for U.S. Appl. No. 14/842,731, filed Sep. 1, 2015, invented by Joshua Fox, Total 8 pages.
Final Office Action, dated Apr. 8, 2016, for U.S. Appl. No. 14/842,731, filed Sep. 1, 2015, invented by Joshua Fox, Total 16 pages.
Response to Final Office Action, dated Jan. 20, 2016, for Serial No. for U.S. Appl. No. 12/648,413, filed Dec. 29, 2009, Invented by Joshua Fox, Total 14 pages.
Notice of Appeal, dated Feb. 19, 2016, for U.S. Appl. No. 12/648,413, filed Dec. 29, 2009, invented by Joshua Fox, Total 2 pages.
Pre-Appeal Brief Request for Review, dated Feb. 19, 2016, for U.S. Appl. No. 12/648,413, filed Dec. 29, 2009, invented by Joshua Fox, Total 6 pages.
Notice of Allowance, dated Mar. 29, 2016, for U.S. Appl. No. 12/648,413, filed Dec. 29, 2009, invented by Joshua Fox, Total 10 pages.
Final Office Action, dated Feb. 3, 2016, for U.S. Appl. No. 13/431,032, filed Mar. 27, 2012, invented by Joshua Fox et al., Total 12 pages.
Response to Final Office Action, dated May 3, 2016, for U.S. Appl. No. 13/431,032, filed Mar. 27, 2012, invented by Joshua Fox et al., Total 9 pages.
Response to Final Office Action, dated Aug. 11, 2016, for U.S. Appl. No. 13/676,712, filed Nov. 14, 2012, Invented by S. Avrahami et al., Total 11 pages.
Office Action dated Oct. 6, 2016, for U.S. Appl. No. 13/676,712, filed Nov. 14, 2012, invented by S. Avrahami et al., Total 12 pages.
Office Action, dated Aug. 25, 2016, for U.S. Appl. No. 14/842,731, filed Sep. 1, 2015, invented by Joshua Fox, Total 16 pages.
Amendment, dated Jun. 28, 2016, for Serial No. for U.S. Appl. No. 12/648,413, filed Dec. 29, 2009, invented by Joshua Fox, Total 7 pages.
Notice of Allowance, dated Nov. 2, 2016, for U.S. Appl. No. 13/431,032, filed Mar. 27, 2012, invented by Joshua Fox et al., Total 23 pages.
Response to Office Action dated Jan. 6, 2017, for U.S. Appl. No. 13/676,712, filed Nov. 14, 2012, invented by S. Avrahami et al., Total 10 pages.
Office Action, dated Feb. 24, 2017, for U.S. Appl. No. 14/228,246, filed Mar. 27, 2014, invented by S. Avrahami et al.,, Total 8 pages.
Response to Office Action, dated Dec. 27, 2016, for U.S. Appl. No. 14/842,731, filed Sep. 1, 2015, invented by Joshua Fox, Total 9 pages.
Notice of Allowance, dated Nov. 15, 2016, for U.S. Appl. No. 12/648,413, filed Dec. 29, 2009, invented by Joshua Fox, Total 27 pages.
Corrected Notice of Allowability, dated Feb. 21, 2017, for U.S. Appl. No. 12/648,413, filed Dec. 29, 2009, invented by Joshua Fox, Total 14 pages.
Final Office Action, dated Mar. 30, 2017, for U.S. Appl. No. 13/676,712, filed Nov. 14, 2012, invented by Joshua Fox, Total 15 pages.
Response to Final Office Action, dated May 31, 2017, for U.S. Appl. No. 13/676,712, filed Nov. 14, 2012, invented by Joshua Fox, Total 10 pages.
Notice of Allowance, dated Jun. 15, 2017, for U.S. Appl. No. 13/676,712, filed Nov. 14, 2012, invented by Joshua Fox, Total 21 pages.
Response to Office Action, dated May 25, 2017, for U.S. Appl. No. 14/228,246, filed Mar. 27, 2014, invented by Shlomit Avrahami et al., Total 9 pages.

(56) References Cited

OTHER PUBLICATIONS

Notice of Allowance, dated Jun. 16, 2017, for U.S. Appl. No. 14/228,246, filed Mar. 27, 2014, invented by Shlomit Avrahami et al., Total 64 pages.
Final Office Action, dated Apr. 28, 2017, for U.S. Appl. No. 14/842,731, filed Sep. 1, 2015, invented by Joshua Fox, Total 16 pages.
Response to Final Office Action, dated Jun. 28, 2017, for U.S. Appl. No. 14/842,731, filed Sep. 1, 2015, invented by Joshua Fox, Total 8 pages.
Notice of Allowance, dated Jul. 19, 2017, for U.S. Appl. No. 14/842,731, filed Sep. 1, 2015, invented by Joshua Fox, Total 9 pages.
Notice of Allowance, dated May 3, 2017, for U.S. Appl. No. 13/431,032, filed Mar. 27, 2012, invented by Joshua Fox et al., Total 20 pages.
Corrected Notice of Allowability, dated Jun. 12, 2017, for U.S. Appl. No. 13/431,032, filed Mar. 27, 2012, invented by Joshua Fox et al., Total 6 pages.
Notice of Allowance, dated Sep. 25, 2017, for U.S. Appl. No. 13/676,712, filed Nov. 14, 2012, invented by Shlomit Avrahami et al., Total 10 pages.
Notice of Allowance. dated Oct. 12, 2017, for U.S. Appl. No. 14/228,246, filed Mar. 27, 2014, invented by Shlomit Avrahami et al., Total 10 pages.
Notice of Allowance, dated Dec. 12, 2017, for U.S. Appl. No. 14/842,731, filed Sep. 1, 2015, invented by Joshua Fox, Total 13 pages.
Notice of Allowance, dated Sep. 27, 2017, for U.S. Appl. No. 13/431,032, filed Mar. 27, 2012, invented by Joshua Fox et al., Total 9 pages.
Office Action, dated Oct. 5, 2018, for U.S. Appl. No. 14/842,731, filed Sep. 1, 2015, invented by Joshua Fox, Total 12 pages.

* cited by examiner

| EMPL-OYEE ID | LASTNAME, FIRSTNAME | TITLE | ADDRESS | PERFOR-MANCE SCORE | SALARY | BONUS | NOTES |
|---|---|---|---|---|---|---|---|
| 1 | DAVOLIO, NANCY | SALES REP. | 507 – 20TH AVE. E. APT. 2A | 🗋 | 🗋 | 🗋 | MONTHLY PAY OF SALARY. THE REMAINDER IS A ONE-TIME SPECIAL BONUS. |
| 2 | FULLER, ANDREW | VP SALES | 908 W. CAPITAL WAY | 🗋 | 70000 | 1200 | ANDY'S SALARY WILL BE RAISED TO $90000 AS OF JANUARY. |
| 3 | LEVERLING, JANET | SALES REP | 722 MOSS BAY BLVD. | 🗋 | 🗋 | 🗋 | LAST NAME CHANGED 4-APRIL-2007 FROM FLEMING. |
| 4 | PEACOCK, MARGARET | SALES REP | 4110 OLD REDMOND RD. | 🗋 | 🗋 | 🗋 | THE SALARY REFLECTS SPECIAL TAX CONSIDERATIONS FOR MARYLAND. |
| 5 | BUCHANAN, STEVEN | SALES MGR | PO BOX 2707 | 🗋 | 🗋 | 🗋 | USE 14 GARRETT HILL, BALTIMORE 21201 AS STEVE'S ADDRESS |
| 6 | SUYAMA, MICHAEL | SALES REP | COVENTRY HOUSE MINER RD. | 2 | | | |

Fig. 4A

PRIVACY-AWARE REVIEW TOOL – LICENSE.TXT ✕

⚠ THE COMPLIANCE CHECKER HAS DETECTED PERSONAL INFORMATION IN THIS DOCUMENT. THIS INFORMATION MIGHT NOT BE REQUIRED FOR YOUR BUSINESS NEEDS. IF YOU THINK OTHERWISE, YOU CAN EXPLICITLY DISCLOSE CERTAIN FIELDS. NOTE THAT ACCESS TO PROTECTED DATA IS CLOSELY MONITORED.

[ VIEW ]
[ VIEW ALL ]

<NAME>  — 412
<ADDRESS>  — 414
DOB: <DOB>  SEX: M  — 416
HEIGHT: 6-1   EYE COLOR: BLUE
COUNTY: QUEENS

LICENSE CLASS: "D"          STATUS: VALID   EXPIRATION: 04/06/2002
PERMIT CLASS: NOW CDL C   STATUS: VALID   EXPIRATION: 04/06/1995

ENDORSEMENTS:  NONE
RESTRICTIONS:  NONE

ACTIVITY

SUSPENSION: 07/12/1998 FAILURE TO PAY FINE    ORDER #: J343009
LOCATION: KINGS COUNTY, BROOKLYN SOUTH ADMINISTRATIVE ADJ.
JUDGMENT AMOUNT: 60    COUNTY: QUEENS
CLEAR ON: 04/10/2000  JUDGMENT SATISFIED

[ CONFIGURE... ]

PRIVACY-AWARE REVIEW TOOL – LICENSE.TXT

⚠ THE COMPLIANCE CHECKER HAS DETECTED PERSONAL INFORMATION IN THIS DOCUMENT. THIS INFORMATION MIGHT NOT BE REQUIRED FOR YOUR BUSINESS NEEDS. IF YOU THINK OTHERWISE, YOU CAN EXPLICITLY DISCLOSE CERTAIN FIELDS. NOTE THAT ACCESS TO PROTECTED DATA IS CLOSELY MONITORED.

[VIEW]
[VIEW ALL]

DOE, JOHN
<ADDRESS>          ← 414
<DOB>  SEX: M      ← 416
HEIGHT: 6-1    EYE COLOR: BLUE
COUNTY: QUEENS

LICENSE CLASS: "D"          STATUS: VALID   EXPIRATION: 04/06/2002
PERMIT CLASS: NOW CDL C  STATUS: VALID   EXPIRATION: 04/06/1995

ENDORSEMENTS: NONE
RESTRICTIONS:   NONE

ACTIVITY

SUSPENSION: 07/12/1998 FAILURE TO PAY FINE    ORDER #: J343009
LOCATION: KINGS COUNTY, BROOKLYN SOUTH ADMINISTRATIVE ADJ.
JUDGMENT AMOUNT: 60     COUNTY: QUEENS
CLEAR ON: 04/10/2000  JUDGMENT SATISFIED

[CONFIGURE...]

DATA ACCESS CONTROL WITH FLEXIBLE DATA DISCLOSURE

FIELD OF THE INVENTION

The invention relates to computer data access control in general.

BACKGROUND OF THE INVENTION

Data access control systems and methods in computing today typically apply a predefined access control model to data, presenting to computer users data to which they are authorized access, while withholding data to which they are not authorized access. Once an access control model has been defined, changing business requirements often make it necessary to give users access to data to which they are not authorized access according to the existing model, and thus the access control model must be continually redefined as business requirements change. Unfortunately, such redefinitions are typically subject to administrative bureaucracy and therefore lag behind current business requirements. Systems and methods for data access control that allow an existing access control model to meet changing business requirements even before the model is redefined would therefore be advantageous.

SUMMARY OF THE INVENTION

The invention in embodiments thereof discloses novel systems and methods for data access control with flexible data disclosure.

In one aspect of the invention a method is provided for presenting data, the method including presenting via a first computer output device an indicator indicating a data item whose value is prevented, in accordance with predefined access control criteria, from being presented via the first computer output device, receiving from a requestor a request to present the data item value, maintaining a record of an identity of the requestor together with a description of the requested data item, and presenting via a second computer output device the data item value.

In another aspect of the invention the presenting steps comprise presenting where the first and second computer output devices are the same computer output device.

In another aspect of the invention the method further includes receiving from the requestor an explanation for the request, and maintaining the explanation together with the record.

In another aspect of the invention any of the presenting, receiving, an maintaining steps are performed when the data item represents a subset of a set of one or both of structured or unstructured data.

In another aspect of the invention the method further includes controlling access to one or both of structured and unstructured data in accordance with the predefined access control criteria by presenting via the first computer output device at least one portion of the data to which access is allowed in accordance with the criteria, where the portion is presented together with the indicator of the data item whose value is prevented from being presented.

In another aspect of the invention a system is provided for presenting data, the system including a data access controller configured to present via a first computer output device an indicator indicating a data item whose value is prevented, in accordance with predefined access control criteria, from being presented via a computer output device, a run-time data access modifier configured to receive from a requestor a request to present the data item value, and cause the data item value to be presented via a second computer output device, and a data access request logger configured to maintain a record of an identity of the requestor together with a description of the requested data item, where any of the data access controller, run-time data access modifier, and data access request logger are implemented in one or both of computer hardware and computer software embodied in a computer-readable medium.

In another aspect of the invention the first and second computer output devices are the same computer output device.

In another aspect of the invention the run-time data access modifier is configured to receive from the requestor an explanation for the request, and the data access request logger is configured to maintain the explanation together with the record.

In another aspect of the invention the data item represents a subset of a set of one or both of structured or unstructured data.

In another aspect of the invention the data access controller is configured to control access to one or both of structured and unstructured data in accordance with the predefined access control criteria by presenting via the first computer output device at least one portion of the data to which access is allowed in accordance with the criteria, where the portion is presented together with the indicator of the data item whose value is prevented from being presented.

In another aspect of the invention a computer program product is provided for presenting data, the computer program product including a computer readable medium, and computer program instructions operative to present via a first computer output device an indicator indicating a data item whose value is prevented, in accordance with predefined access control criteria, from being presented via a computer output device, receive from a requestor a request to present the data item value, maintain a record of an identity of the requestor together with a description of the requested data item, and present via a second computer output device the data item value, where the program instructions are stored on the computer readable medium.

In another aspect of the invention the computer program instructions are operative to present where the first and second computer output devices are the same computer output device.

In another aspect of the invention the computer program instructions are operative to receive from the requestor an explanation for the request, and maintain the explanation together with the record.

In another aspect of the invention the computer program instructions are operative when the data item represents a subset of a set of one or both of structured or unstructured data.

In another aspect of the invention the computer program instructions are operative to control access to one or both of structured and unstructured data in accordance with the predefined access control criteria by presenting via the first computer output device at least one portion of the data to which access is allowed in accordance with the criteria, where the portion is presented together with the indicator of the data item whose value is prevented from being presented.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
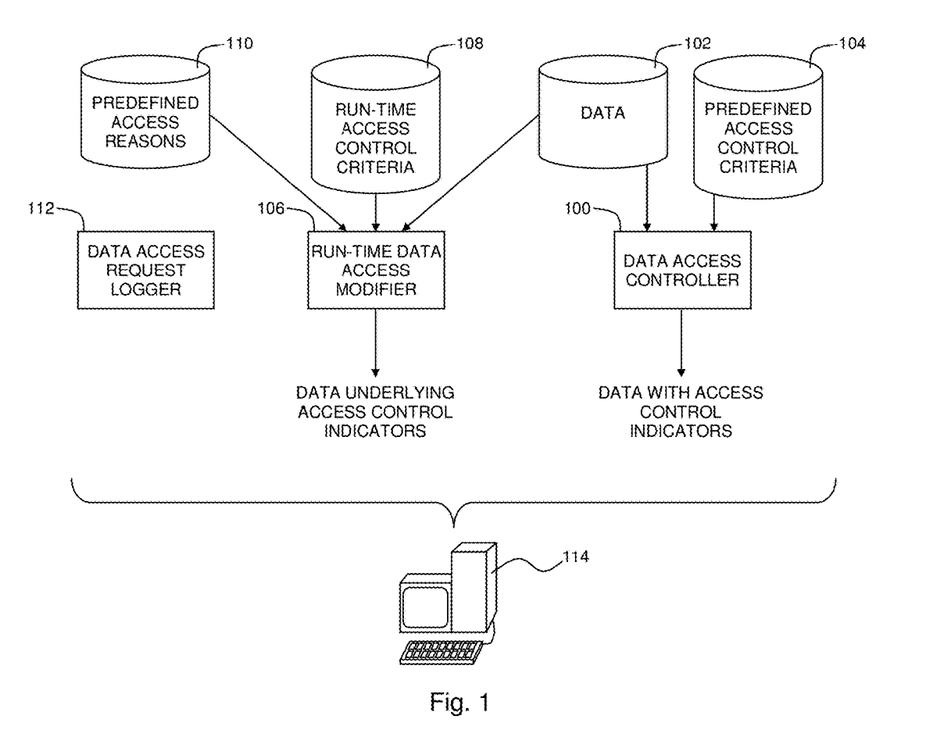
FIG. 1 is a simplified conceptual illustration of a system for data access control with flexible disclosure, constructed and operative in accordance with an embodiment of the invention.

Reference is now made to FIG. 1, which is a simplified conceptual illustration of a system for data access control with flexible disclosure, constructed and operative in accordance with an embodiment of the invention. In the system of FIG. 1, a data access controller 100 is configured to control access to structured or unstructured data 102 and present data 102 in accordance with predefined access control criteria 104, preferably in accordance with conventional access control techniques employing a predefined model, such as a regulation-driven a policy model, of entities, roles, policies, rules, actions, and obligations based on regulations and business requirements, and controlling structured and unstructured data in the same way. For example, where data 102 is to be presented to an individual identified as having the role of a physician, the individual may be authorized to perform read and write actions on a medical record for a given patient provided that a rule is satisfied that the physician is identified as the patient's caregiver. However, the physician may not be authorized to see the patient's financial records. In this example data access controller 100 preferably presents patient data to the physician, such as on a computer display or other computer output device, where those portions of the patient data that the physician is authorized to access are displayed, while those portions of the patient data that the physician are not authorized to access is not displayed. Data access controller 100 preferably presents one or more access control indicators indicating that access to one or more data items is prevented, such as by leaving a data item blank or displaying an icon or the words "Access Restricted" or the semantic type of the deleted data, or an exemption code stating the law or regulation requiring the deletion in place of the value of the data item to which access is restricted.

A run-time data access modifier 106 is configured to receive a request from a requestor to provide access to one or more data items presented by data access controller 100, but to which access is currently prevented. Thus, in the example above, although the physician is not given access to a patient's financial data by default, the physician may nevertheless request access to the patient's financial data, such as where the physician requires knowledge of a patient's financial situation in order to choose between more or less expensive approaches to diagnosis or treatment. In one embodiment run-time data access modifier 106 consults run-time access control criteria 108 to determine whether a permission has been predefined allowing such a request, where the permission may be predefined at any level of access control, such as for a specific user, role, data item, etc. If such permission is found or is not required, run-time data access modifier 106 then causes the value of the requested data item to be presented, such as on the same or a different computer display or other computer output device. Run-time data access modifier 106 may itself present the value or may instruct data access controller 100 to do so.

In one embodiment run-time data access modifier 106 is configured to allow or require that such requests be accompanied by a reason for the request, such as may be determined in accordance with run-time access control criteria 108. The reason may be manually entered by the requestor or selected by the requestor from a database 110 of predefined reasons, which may be predefined at any level of access control, such as for a specific user, role, data item, etc., and which may also indicate to run-time data access modifier 106 whether or not to grant access to requested data.

A data access request logger 112 is configured to maintain a record of the identity of the requestor together with a description of the requested data item and the reason given for the request, if given, and may also include additional information such as the semantic type of the data item, the role of the requester, and the time of the request. Such information may be later analyzed to determine whether the request was justified, whether disciplinary action should be taken, and/or whether any of the data access model elements, permissions, or reasons described above should be modified to further restrict access to data and/or relax existing restrictions.

Any of the elements shown in FIG. 1 are preferably executed by or otherwise made accessible to a computer 114, such as by implementing any of the elements shown in FIG. 1 in computer hardware and/or in computer software embodied in a computer-readable medium in accordance with conventional techniques.

Figure 2:
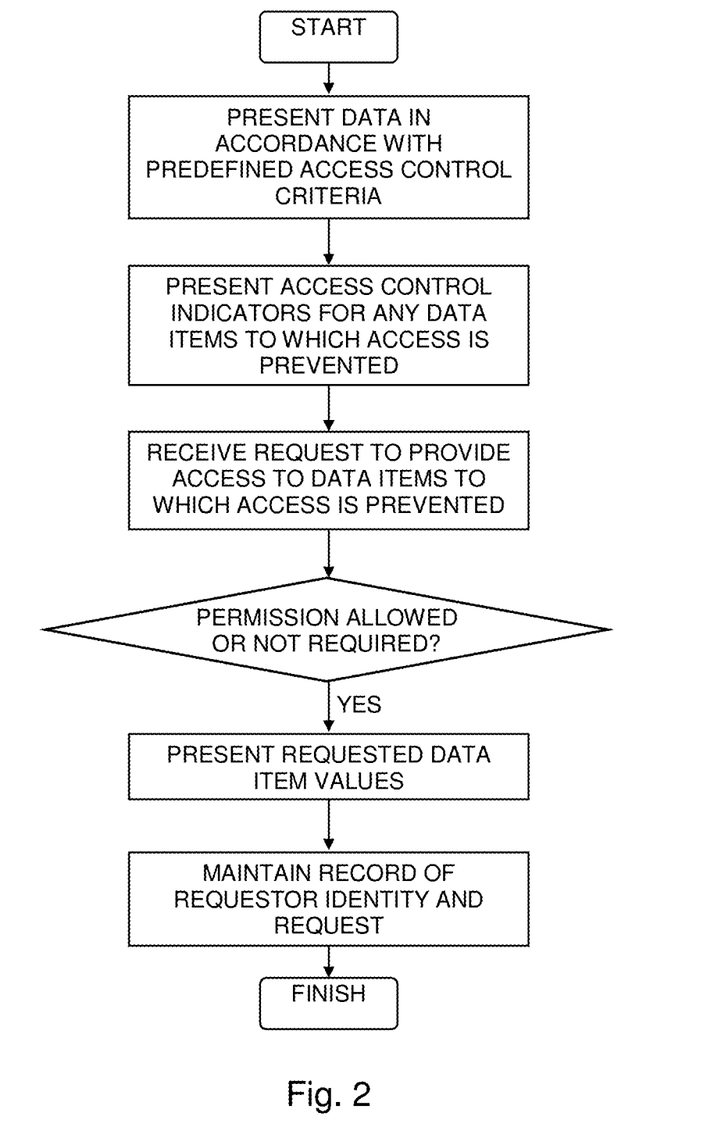
FIGS. 2 and 3 are simplified flowchart illustrations of exemplary methods of operation of the system of FIG. 1, operative in accordance with embodiments of the invention.

Reference is now made to FIG. 2, which is a simplified flowchart illustration of an exemplary method of operation of the system of FIG. 1, operative in accordance with an embodiment of the invention. In the method of FIG. 2, data is presented on a computer output device in accordance with predefined access control criteria, where data that are authorized for access is presented, while data that are not authorized for access is not presented. One or more access control indicators are presented indicating that access to one or more data items is prevented. A request is received from a requestor to provide access to one or more data items to which access is currently prevented, where such requests may be for one or more specific data items within a larger set of structured or unstructured data. If a permission has been predefined allowing such a request, or if such permission is not required, the value of the requested data item is presented on the same or a different computer output device. A record is maintained of the identity of the requestor together with a description of the requested data item.

Figure 3:
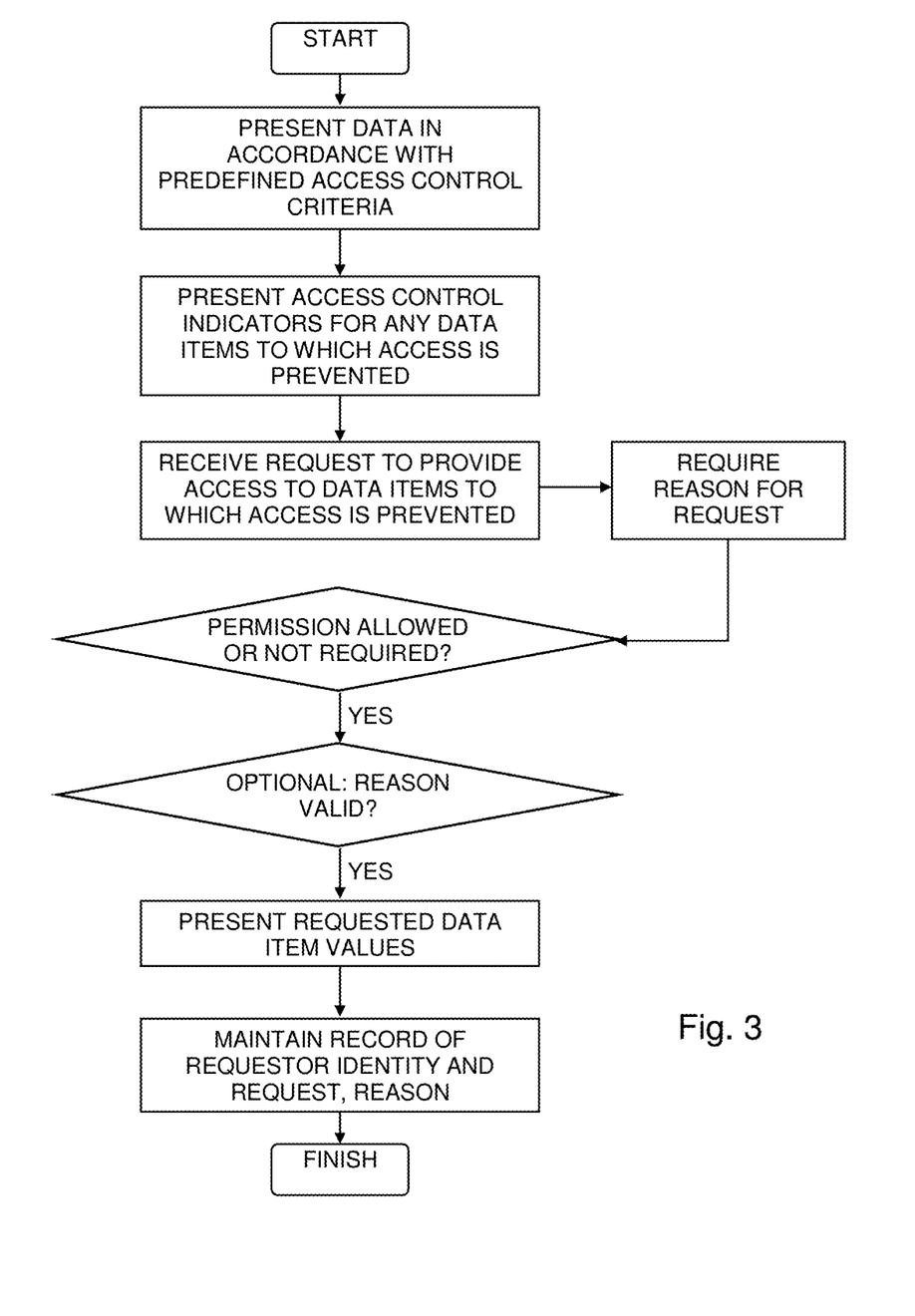

Reference is now made to FIG. 3, which is a simplified flowchart illustration of an exemplary method of operation of the system of FIG. 1, operative in accordance with an alternative embodiment of the invention. The method of FIG. 3 is substantially similar to the method of FIG. 2, with the notable exception that requests for data that are not authorized for access must be accompanied by a reason for the request, and the decision whether or not to grant access to requested data may be predicated on the type of reason given. A record is maintained of the identity of the requestor together with a description of the requested data item and the reason given for the request.

Figure 4A:
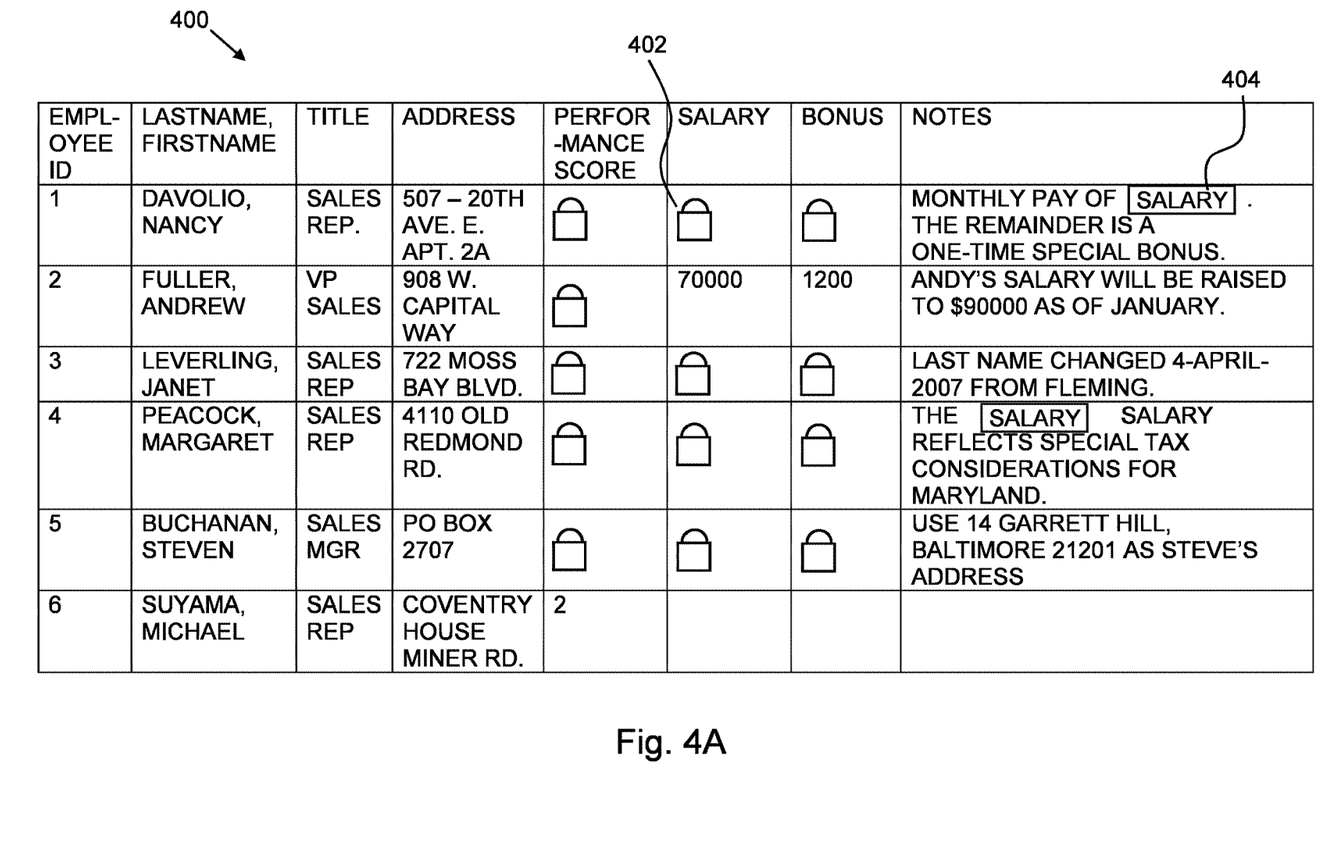
FIGS. 4A-4D are examples of displayed data, useful in understanding the invention.

The system and method of FIGS. 1, 2, and 3 may also be understood by way of example as shown in FIGS. 4A-4D as follows. In FIG. 4A a series of employee records are shown in a table 400 as table 400 may appear on a computer display. In the example shown an access control indicator 402, such as in the form of a lock icon, is displayed in place of data item values for the data items PerformanceScore, Salary, and Bonus to which access is not authorized by default for most of the records displayed.

Figure 4B:
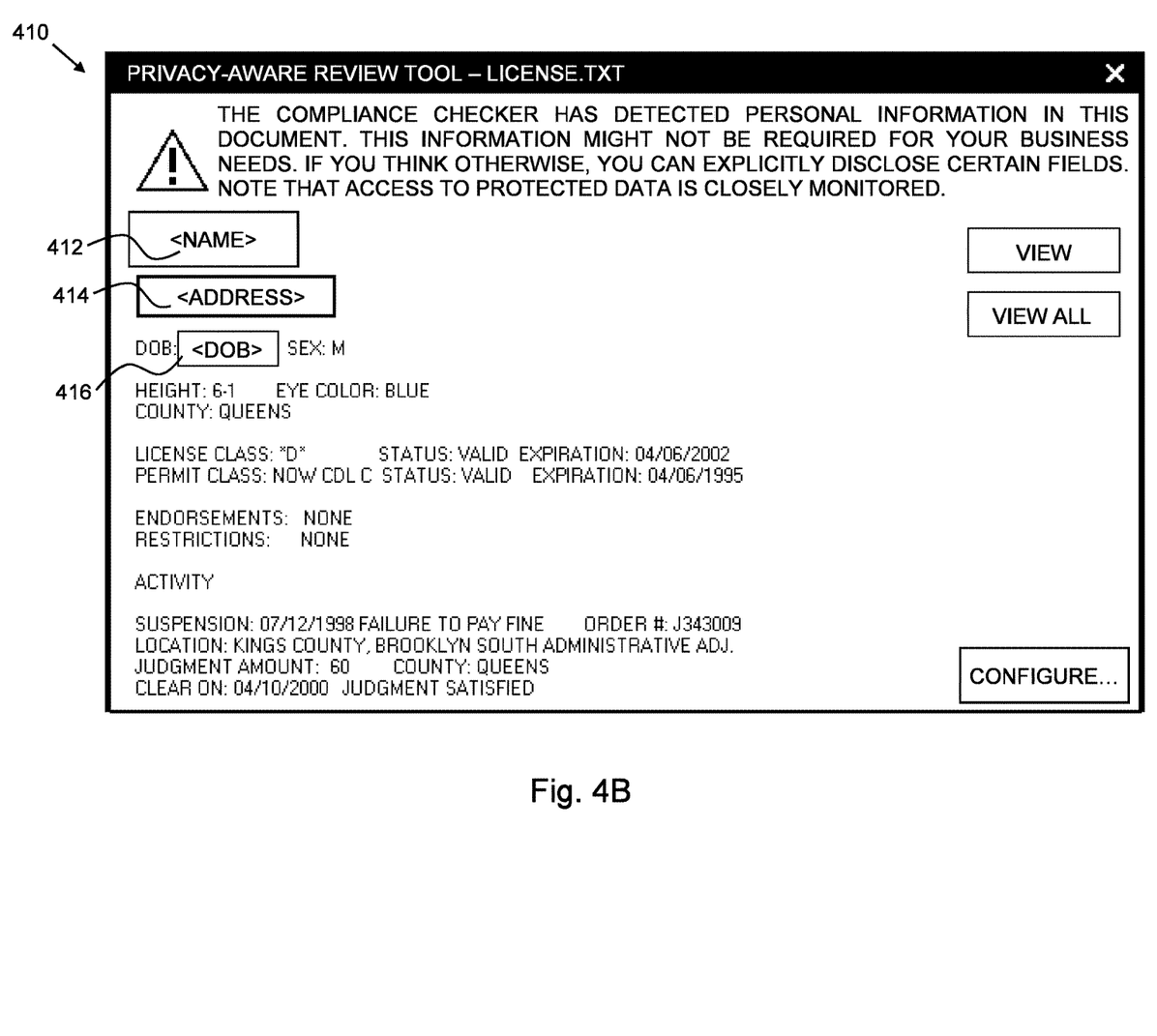

In one embodiment of the invention, access to data within a data field may be controlled such that access to some data within the field is authorized, while access to other data within the field is not. Thus, in the example shown, an access control indicator 404, such as in the form of a box labeled with the word "Salary", is displayed over a salary value within the Notes field, or is otherwise placed within the Notes field, to obscure or replace a salary value to which access is not authorized by default. Placement of an access control indicator within a field to partially obscure or replace data within the field may be performed whether or not specific access control measures have been defined for the field. Thus, for example, where no specific access control measures have been defined for the Notes field, the invention nevertheless contemplates obscuring or replacing data within the field in accordance with one or more predefined rules, such as where a data item value in a field to which access is not authorized in a given a record, such as a value in the Salary field, is obscured or replaced if it is found within a different field in the same record, such as in the Notes field, even where no access control measures have been defined for the Notes field. Additionally or alternatively, if there is an obligation associated with data found in such a manner, the obligation may be executed as a result. Such data values may be found using conventional techniques, such as named entity extraction, where known text and/or numeric patterns are identified within structured or unstructured fields within records, such as those shown in FIG. 4A, or within unstructured documents, such as is shown in FIG. 4B with reference to access control indicators 412, 414, and 416 of an unstructured document 410. Such patterns may, for example, include social security number or credit card number formats, address structures, and lexical affinities such as where the words "years old" appear in the vicinity of a number. Additionally or alternatively, where metadata is available that specifies the nature of data, as in common with structured data sources, such metadata may be used as well.

Figure 4C:
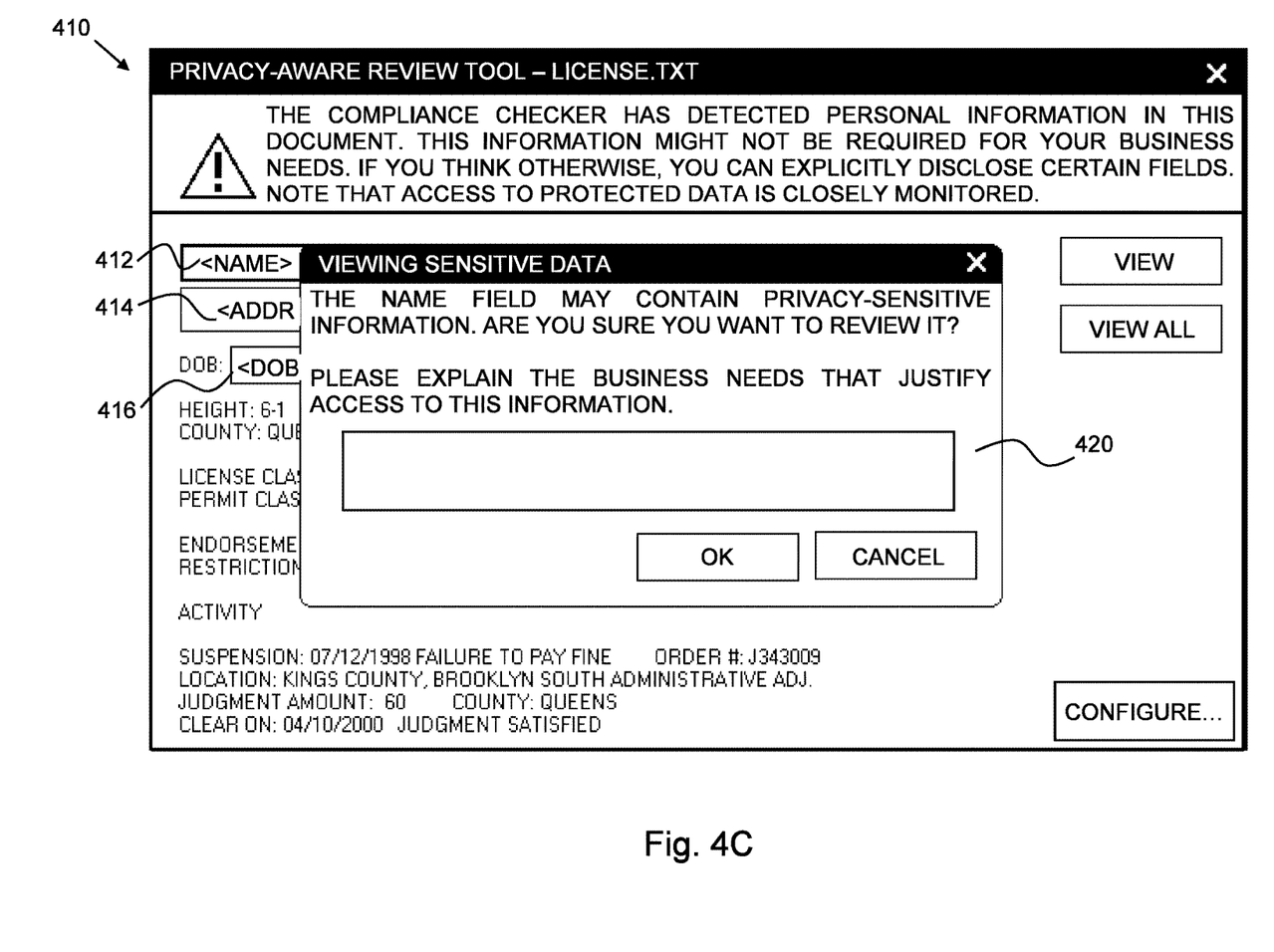
Figure 4D:
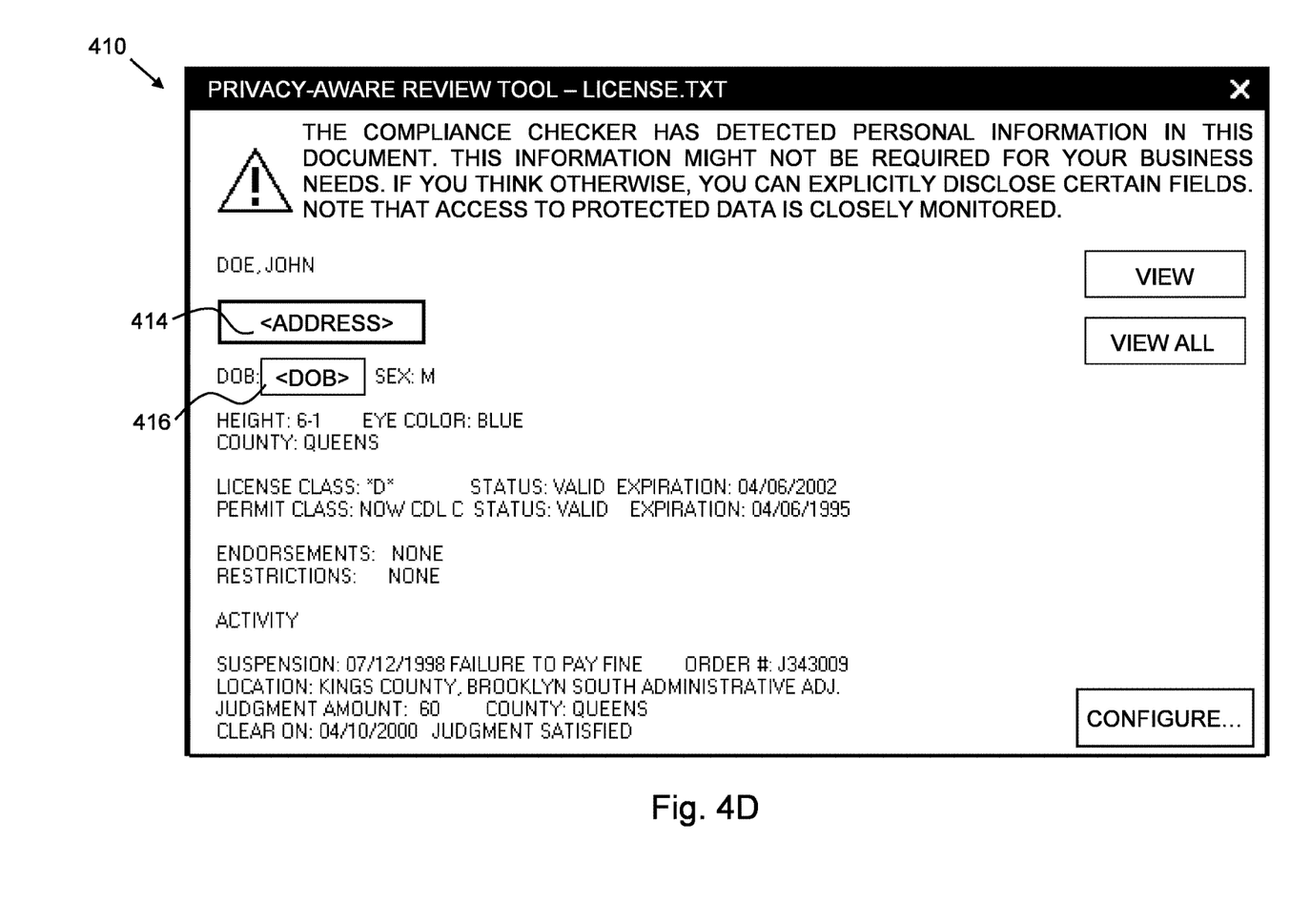

Continuing with the example shown in FIG. 4B, selecting an access control indicator, such as indicator 412 for Name information, and requesting to view its underlying information causes a reason window 420 to appear, as shown in FIG. 4C, in which the requestor of the underlying information provides a reason for the request. Additionally or alternatively, requestors may be required to explicitly sign such requests using any suitable signing convention. If a permission has been predefined allowing such a request, or if such permission is not required, the value of the requested data item is shown, as in FIG. 4D where the Name information is displayed.

Figure 5:
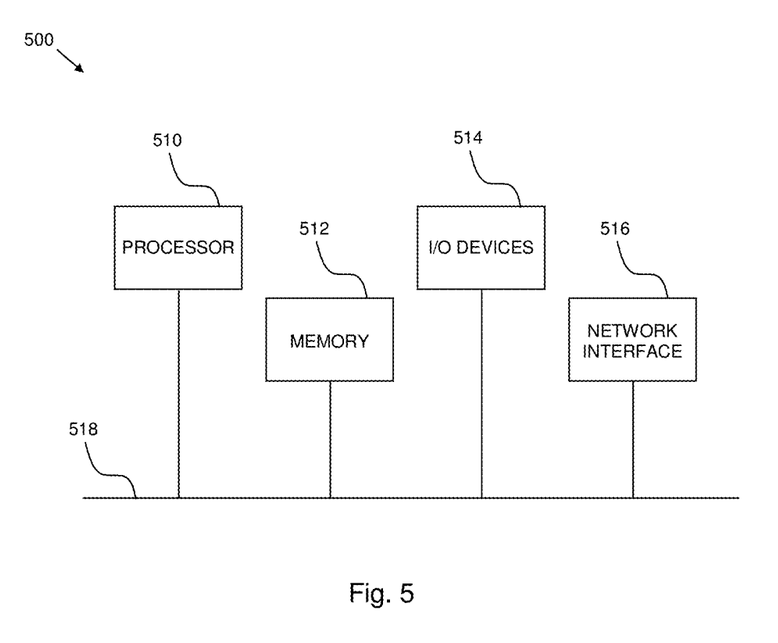
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method, comprising:
controlling access to a data item value of a data item that is obscured by an indicator providing a description of the obscured data item value, wherein the data item is any one of a structured data and an unstructured data, by:
presenting, with a first computer output device, the indicator; and
in response to receiving a request from a requestor to access the data item value,
receiving a reason for the request, wherein the reason is associated with a level of access control, wherein the level of access control is based on any one of the requestor, a role, and the data item value;
determining that the reason is valid;
providing access to the data item value by presenting the data item value on a second computer output device; and
recording an identity of the requestor, the reason, and the description of the data item value.

2. A method according to claim 1, wherein the providing the access to the data item value is in accordance with a predefined access control criteria.

3. A method according to claim 1, wherein the indicator is provided in place of the data item value indicating that access to the data item value is prevented in accordance with a predefined access control criteria.

4. A system, comprising:
a processor;
storage coupled to the processor, wherein the storage stores computer program instructions, and wherein the processor executes the computer program instructions to perform operations, and wherein the operations comprise:
controlling access to a data item value of a data item that is obscured by an indicator providing a description of the obscured data item value, wherein the data item is any one of a structured data and an unstructured data, by:
presenting, with a first computer output device, the indicator; and
in response to receiving a request from a requestor to access the data item value, receiving a reason for the request, wherein the reason is associated with a level of access control, wherein the level of access control is based on any one of the requestor, a role, and the data item value;

determining that the reason is valid;

providing access to the data item value by presenting the data item value on a second computer output device; and recording an identity of the requestor, the reason, and the description of the data item value.

5. A system according to claim 4, wherein the providing the access to the data item value is in accordance with a predefined access control criteria.

6. A system according to claim 4, wherein the indicator is provided in place of the data item value indicating that access to the data item value is prevented in accordance with a predefined access control criteria.

7. A computer program product stored on a computer readable device, the computer program product comprising computer program instructions, when executed by a processor, operative to perform:

controlling access to a data item value of a data item that is obscured by an indicator providing a description of the obscured data item value, wherein the data item is any one of a structured data and an unstructured data, by:

presenting, with a first computer output device, the indicator; and in response to receiving a request from a requestor to access the data item value, receiving a reason for the request, wherein the reason is associated with a level of access control, wherein the level of access control is based on any one of the requestor, a role, and the data item value;

determining that the reason is valid;

providing access to the data item value by presenting the data item value on a second computer output device; and recording an identity of the requestor, the reason, and the description of the data item value.

8. A computer program product according to claim 7, wherein the providing the access to the data item value is in accordance with a predefined access control criteria.

9. A computer program product according to claim 7, wherein the indicator is provided in place of the data item value indicating that access to the data item value is prevented in accordance with a predefined access control criteria.

* * * * *